Patented June 15, 1926.

1,589,219

UNITED STATES PATENT OFFICE.

CHARLES M. PIPER, OF ALTOONA, PENNSYLVANIA, ASSIGNOR OF ONE-HALF TO WILBUR P. GETTMAN, OF ALTOONA, PENNSYLVANIA.

PAINT AND VARNISH REMOVER.

No Drawing. Application filed November 7, 1923. Serial No. 673,352.

This invention relates to paint and varnish removers that are widely used in the automobile industry of to-day, and has particular reference to means for removing paints and varnishes from automobile bodies that are to be re-painted and re-varnished, and to this end the invention is believed to be one of the most valuable preparations yet devised for the purpose.

The primary object of this invention is to provide a paint and varnish remover that acts readily on all air dried paints and varnishes such that the same can readily be removed with a stream of water from a hose nozzle in a short interval of time after the paint and varnish remover is applied.

Another object of this invention is to provide a paint and varnish remover that is not inflammable and can readily be used on delicate wood bodies of automobiles as well as on steel or aluminum bodies without the usual effect of blistering the bodies, which is common to paint and varnish removers now on the market.

A further object of this invention is to provide a paint and varnish remover that can be applied to automobile bodies with a fibre brush and left undisturbed from ten to twenty hours, after which all paint and grease is readily removed with a jet of water from a hose nozzle, this alone contributes to its utility, in crowded automobile paint shops and factories, where work is produced on a schedule basis.

With these and many other objects in view which will be more readily apparent as the nature of the invention is better understood, the same consists in the novel combination and mixture of the various ingredients, as will be herein fully pointed out illustrated and claimed.

It will be quite readily understood by those skilled in the art to which the invention belongs, that the proportions of the various elements can be somewhat changed without departing from the spirit or scope of the invention, but a preferred and thoroughly practical and efficient combination is given below:

5 oz. corn starch.
5½ oz. calcium carbide.
4½ oz. sal soda—sodium carbonate $Na_2Co_3$.
14 oz. lye, a strong caustic alkaline solution.
½ oz. Epsom salts—a hydrated magnesium sulphate.

The corn starch acts as a binder for the various elements of the combination.

The calcium carbide acts mechanically to permit the lye to act on the varnish layers of paint and varnish.

The sal soda or sodium carbonate acts as a solvent augmenting the action of the caustic alkaline solution. This combination of elements which amounts to 29 ozs. is placed in a gallon of pure water and thoroughly mixed, after which it is ready for application to automobile bodies from which the paint is to be removed. The above mixture results in a thin paste of such consistency that when applied to automobile bodies by a paint brush it not only penetrates the long pigments but also attacks and breaks down the short pigments, neutralizing both, after which the body of the paint is readily washed off the car body with the water from a hose.

The calcium carbide acts mechanically to permit the caustic solution and sodium carbonate to attach and break down the various layers of paint and varnish.

This preparation has been found by experience and after much cost and experiment to be admirably adapted for the purpose intended, is cheap to manufacture, not inflammable and easily applied when paint, varnish or grease is to be removed.

When the ingredients are mixed, as above indicated in what has been termed a paste or semi-paste form, the paste may be readily applied to the painted surface in such a way that it will not readily run off. The starch in the mixture produces the pasty characteristic, and the calcium carbide and most of the calcium hydrate resulting from the reactions are in suspension. The calcium carbide is mixed with the other ingredients just prior to being used, and the paste is applied to the painted surface while the mixture is effervescing. The reaction in the mixture due to the mixing of the calcium carbide therewith is relatively slow, and while some of the calcium carbide re-acts in the container prior to the application of the mixture to the painted surface, nevertheless, the reaction of the calcium carbide requires such a length of time that the mixture may be readily applied before the calcium carbide has lost its efficiency. After the paint remover has acted upon the paint and loosened the same, the pigment of the paint may be readily removed by the force of a jet of water from a hose or the like.

Having thus described my invention, what I claim and desire to be secured by Letters Patent is—

1. A paint and varnish removing compound consisting of a non-inflammable paste containing lye, sal soda, hydrated magnesium sulphate, corn starch, and calcium carbide added to the solution just prior to application thereby liberating acetylene gas and forming hydrated lime.

2. A non-inflammable paint and varnish remover consisting of a paste containing approximately 16% corn starch, 14% sal soda, 49% lye, 4% hydrated magnesium sulphate, and 17% hydrated lime resulting from the reaction of calcium carbide in the solution.

In testimony whereof I affix my signature.

CHARLES M. PIPER.